Sept. 25, 1962
R. H. WEILAND
3,055,620
CARGO AIRPLANES
Filed Aug. 10, 1959
3 Sheets-Sheet 1
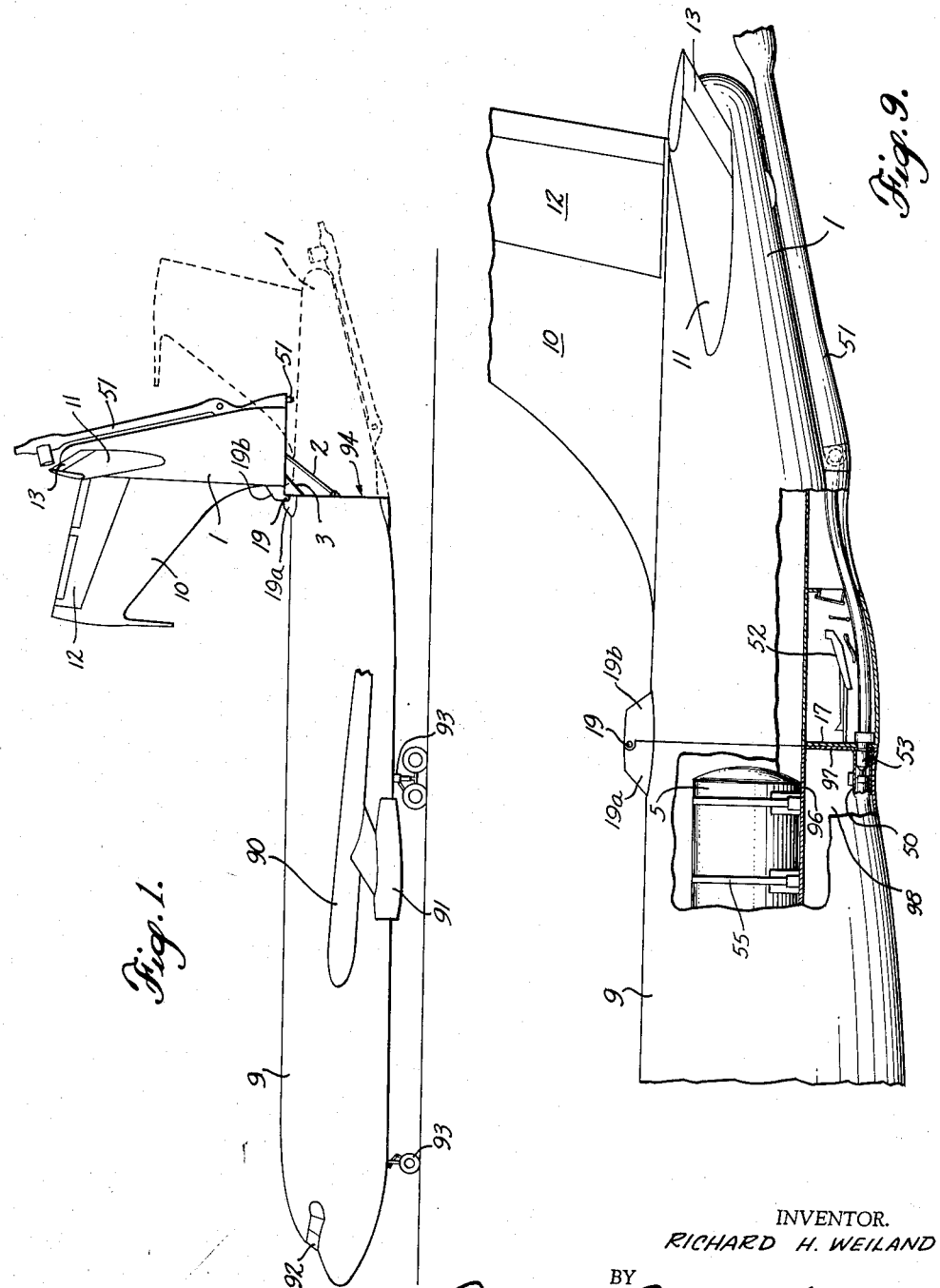
INVENTOR.
RICHARD H. WEILAND
BY
Reynolds, Beach + Christensen
ATTORNEYS

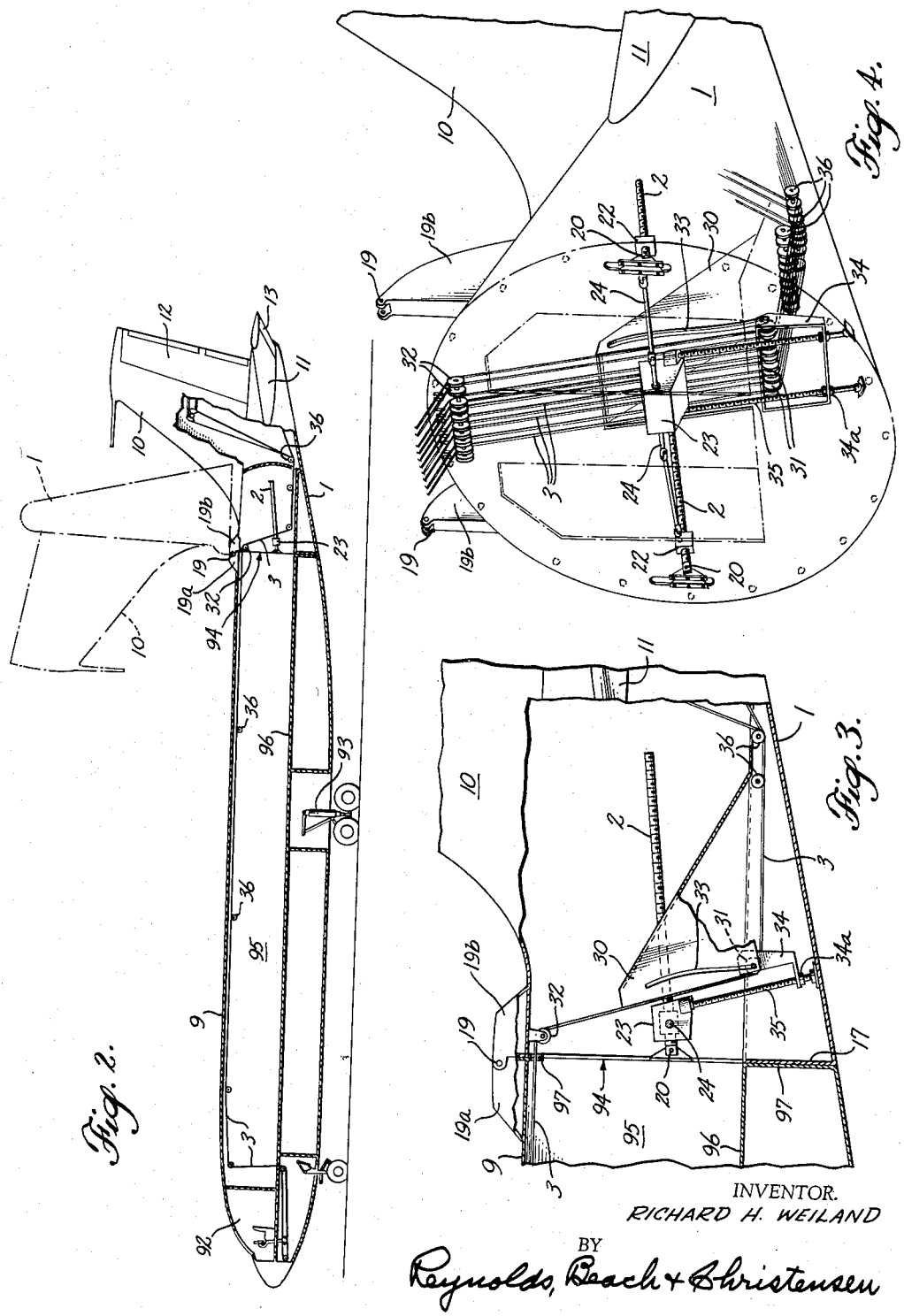

Sept. 25, 1962
R. H. WEILAND
3,055,620
CARGO AIRPLANES
Filed Aug. 10, 1959
3 Sheets-Sheet 3
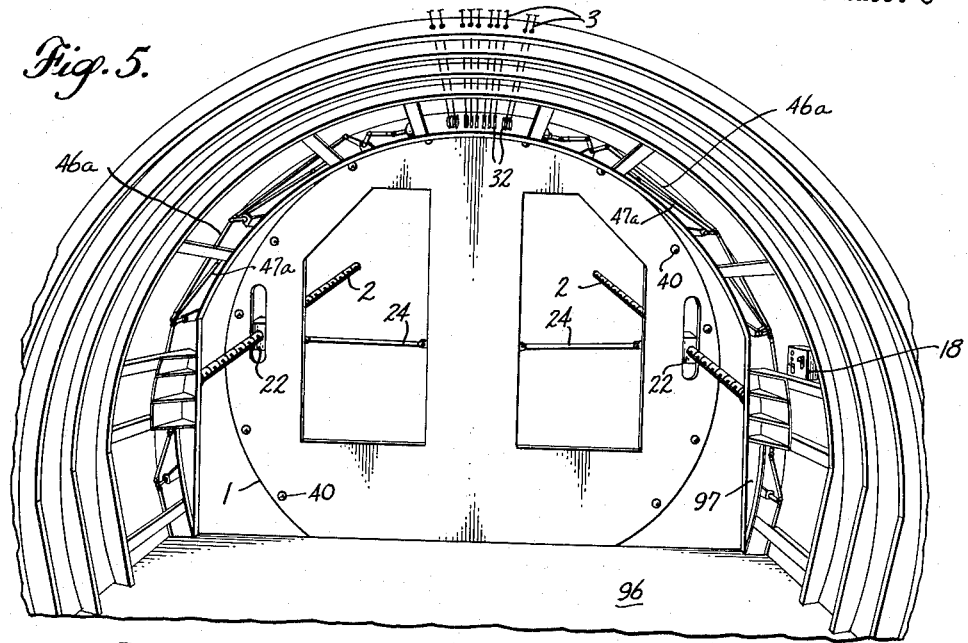
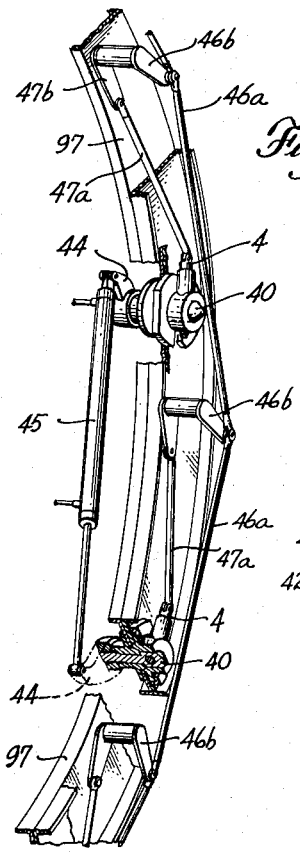
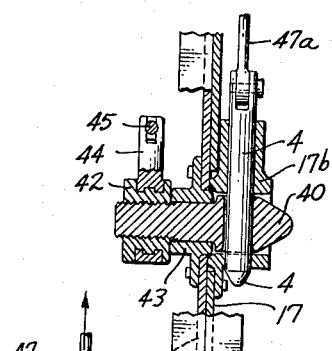
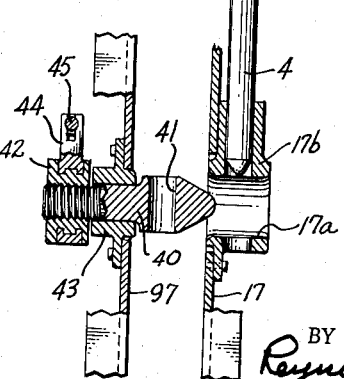
INVENTOR.
RICHARD H. WEILAND
BY
Reynolds, Beach
& Christensen
ATTORNEYS United States Patent Office 3,055,620
Patented Sept. 25, 1962

3,055,620
CARGO AIRPLANES
Richard H. Weiland, Seattle, Wash., assignor to Boeing Airplane Company, Seattle, Wash., a corporation of Delaware
Filed Aug. 10, 1959, Ser. No. 832,700
6 Claims. (Cl. 244—135)

This invention concerns a cargo airplane, and more particularly the construction thereof which facilitates rapid and easy loading and unloading of all sorts of cargo, but especially large, awkward, and heavy units, in minimum turn-around time, yet permits the airplane to be designed as a streamlined, aerodynamically correct unit, with the empennage surfaces carried as usual at the end of a tail section, notwithstanding that the tail section is swingably mounted upon and with respect to the fuselage.

Other than in a cargo airplane which is the subject of a copending application of Ray E. Pearson, Serial No. 832,699, filed August 10, 1959, now Patent No. 2,977,077, cargo airplanes for transport of the sort of cargo mentioned have opened at the front or at the rear end of the fuselage, or by way of large bottom openings. Bottom openings, in addition to requiring heavy framing to compensate for omitted or interrupted frame elements, are not aligned with the main cargo space, hence restrict the length and sometimes the thickness of cargo units which can pass therethrough. Forward end openings require superimposition of the control cabin above the opening, and so increase the frontal area of the airplane to an undesirable degree. Rear end openings have heretofore required mounting the empennage, with its movable control surfaces, on booms or the like that can be built integral with the fuselage, leaving a stubby fuselage with a rear door that can open, for if the empennage were on a swingable tail section the control cables or like control force transmission elements would presumably have to be disconnected for opening movement and reconnected at closing, requiring time for reconnection, and leaving open the possibility of human error and the distastrous failure of control that would follow. Also, there could be danger of fouling such elements if they became slack, and so disabling them. In addition to these considerations, a tail section carrying the empennage must be structurally integral, in flight, with the fuselage proper, in order to transmit stresses between the two. This consideration is rather diametrically opposed to the requirement that the empennage-carrying tail section should be movable relative to the fuselage when groundborne.

The specific form of the Pearson airplane mentioned above proposes a tail section which is hingedly mounted to the fuselage by an upright hinge, whereby it may swing open to one side of the fuselage; empennage surfaces are mounted upon the tail section, control cables or equivalent elements extend thereto uninterruptedly across the hinge line, and locking means are distributed about the plane where the tail section and fuselage join when in longitudinal alignment, in flight condition. The present invention differs from that of Pearson in a number of respects. The tail section, in this invention, swings upwardly about a transverse horizontal axis, whereby the groundborne airplane is relieved of an unbalanced load producing a moment that might, in a heavy wind, tend to tip the airplane, and whereby the upraised tail section constitutes a protection for the immediate loading vicinity. The control cables or equivalent elements, differing from Pearson, extend about sheaves that can not be coaxial with the hinge axis, which would tend to allow them to slacken as the tail section swings up, but herein means are provided for automatically and positively taking up slack, and for letting it out again as the tail section swings down again. Locking means of the general nature disclosed in the Pearson application, but specifically different, are distributed about the juncture between the fuselage and the tail section.

The present invention affords the possibility of carrying as cargo a large fuel tank, from which by known means refueling operations in flight are possible. When other types of cargo are to be transported, the refueling devices offer no obstruction. When refueling is to be accomplished, closure of the tail section into flight position establishes automatically the necessary fuel line connections.

By the construction outlined above there is provided an airplane that is capable of handling cargo units of dimensions equivalent to the maximum dimensions of the cargo space and its opening, and of a weight equal to the load capacity of the airplane. By the use of suitable end-loading cargo-handling devices the airplane can be loaded or unloaded in a minimum of time, so that its turn-around time is low. It can be employed interchangeably as a tanker or for other cargo units, or for personnel. It is balanced evenly while loading, and in flight the tail section is structurally an integral part of the fuselage. The control cables or like elements are uninterrupted at all times, and are always taut, hence will not foul.

The drawings show representative forms and arrangements of the airplane according to this invention, but they are to be taken as examples, and not as limiting the scope of the invention, its scope being set forth in the claims.

FIGURE 1 is a side elevational view, illustrating the airplane with its tail section in alternative positions.

FIGURE 2 is a longitudinal vertical sectional view, showing the arrangement of the control cables.

FIGURE 3 is an enlarged view of the region at the juncture of the tail section and fuselage, illustrating certain details of the control cable tension-maintaining mechanism, and FIGURE 4 is a phantom isometric view of the same.

FIGURE 5 is a perspective view, looking rearwardly from within the fuselage towards the tail section.

FIGURE 6 is an isometric view of details of the locking mechanism, with parts shown in section.

FIGURE 7 is a sectional view through a locking pin and its locking bolt, in locked position, and FIGURE 8 is a similar view with the parts unlocked and partly separated.

FIGURE 9 is a side elevational view, partly broken away, of the rear portion of an airplane according to this invention, arranged as an inflight refueling plane.

The airplane is shown as a typical swept-wing, jet-powered airplane of a general type now flying, and capable of flight at high sub-sonic speeds. Its fuselage 9 is airborne by wings 90 having pod-mounted jet engines 91, and groundborne upon landing gear 93. The control cabin 92 is located in the nose of the fuselage, and substantially all space within the fuselage to the rear of the control cabin and above a deck 96 is available as cargo space 95, accessible through an opening 94 at the rear end, which normally coincides with the last fuselage station of constant diameter (considering the cargo deck as part of that section). A circular stiffener frame or bulkhead 97 frames the rear opening 94.

The separate tail section 1 is hingedly mounted upon the fuselage 9 to swing upwardly and downwardly; compare the dot-dash line and the full line showings in FIGURES 1 and 2. The hinge axis 19 is located just outside the skin of the fuselage, and above the same, directed transversely. Suitable pylons or brackets 19a, 19b are carried by the fuselage and tail section respectively to enable this, and are streamlined. The tail section carries the empennage, such as the vertical and horizontal stabilizers 10 and 11 and associated movable control surfaces 12 and 13. In flight condition the tail section 1 is swung down into streamline continuation of the fuselage, closing its rear opening 94, and with the control surfaces in operative positions. During loading or unloading the tail section is upswung, clear of the opening 94, and a cargo unit such as a missile so long that it could not be maneuvered into a bottom-opening door can be loaded directly endwise straight-in into the cargo space.

The mechanism for swinging the tail section includes lead screws 2 pivotally anchored at 20 to the fuselage terminal stiffener 97 and threadedly engaged with nuts carried by the tail section and rotatable within gear casings 22. A motor for rotating the nuts is housed within a housing 23 swingable with the tail section, and is connected by flexible shafts 24 to the nuts at 22, of which there are two, one at each side.

The control cables 3 extend uninterruptedly from the control cabin 92 to the control surfaces on the tail section. They must be kept taut in all positions of the tail section, which is especially difficult to do when the cables can not be lead about sheaves which coincide axially with the hinge axis 19. They can not be herein, since the hinge axis is outside the skin contour. The cables are extended about sheaves 32 which are near the hinge axis, but some difference in overall length of the cables occurs as the tail section hinges, and it is necessary to take up and pay out such slack. To this end the cables are lead about guide sheaves 31 which are journaled in a bracket 34, which is shiftable relative to a box or bracket 30 fixed to and swingable with the tail section, this box having a cam slot 33 which the axes of sheaves 31 may traverse, under control. The bracket 34 mounts a nut 34a, through which is threaded an adjusting screw 35, rotatable by the motor housed at 23. As the tail section 1 swings upwardly, the nut 34a and hence the sheaves 31 move upwardly, the axes of the sheaves being guided in the cam slot 33. The latter is so formed with relation to the geometry of the tail section and fuselage as to maintain the cables 3 taut in all swung positions of the tail section.

It will be noted that the cables 3 are clear of structure or cargo within the cargo space. Various other guide sheaves 36 are provided, as may be needed.

Operation of the tail section may be controlled from a control station at the rear opening of the fuselage, a control box 18 being provided there.

The tail section must be securely locked in its flight position. Locking pins 40 are distributed around the rear terminal frame 97 of the fuselage and complemental locking bolts 4 about the abutting forward frame or stiffener 17 of the tail section, or the pins may be carried by the tail section and the locking bolts by the fuselage proper. These pins and bolts are formed and positioned for interengagement when the tail section is fully closed. Thus, the pins 40, directed longitudinally of the fuselage, extend through holes 17a in reinforcing collars 17b fixed upon the stiffener 17, and locking bolts 4 are guided in the collars 17b for movement tangentially of the adjacent skin, to penetrate holes 41 in the pins 40. This interengagement can be tightened by rotation of a nut 42 upon a threaded end of the pin 40, so that reaction against the guide 43 wherein the pin 40 is non-rotatively guided will tend to shift the pin and its hole 41 relative to the bolt 4. All nuts 42 are joined by levers 44 to an actuator or actuators 45, for simultaneous operation, and all locking bolts 4 are joined by links 46a and 47a, and levers 46b and 47b, to a common actuator (not shown), for simultaneous operation.

During flight the tail section 1 constitutes a streamlined rear continuation of the fuselage 9. The pins 40 and bolts 4, as well as the lead screws 2, retain the two integral in effect. The control cables 3 extend uninterruptedly from the control cabin 92 to the control surfaces such as 12 and 13 carried by the tail section, and stresses are transmitted by the locking elements between the fuselage and the tail section. Upon landing and coming to rest, the locking pins are relaxed and the locking bolts withdrawn, whereupon the tail section is free to be swung upwardly to the full line position of FIGURE 1, clear of the rear opening 94. Upswung, it constitutes some measure of shelter behind that opening. Cargo, even that of a length and transverse dimensions to occupy the whole of the cargo space 95, can be moved endwise straight in into or from that cargo space, without obstruction. The operation completed, the tail section is swung shut, is secured by the bolts 4 and pins 40, and the airplane is ready for take-off. The mechanism including the cam slot 33 maintains the cables 3 taut in all positions of the tail, and they are out of the way of cargo.

The ability to utilize all the cargo space makes it possible to carry a large fuel tank 5 (FIGURE 9) within this cargo space, leading to a female connection at 50 near the rear end thereof, and to mount a male connector 53 upon the tail section in position to couple with the connection 50 by the action of closing the tail section. A refueling boom 51 of known type is mounted upon the tail section for control by a refueling operator at station 52. Access to this station can be had through tunnel 98 beneath deck 96. If cargo other than fuel is to be carried, it requires but little time and effort to remove the fuel tank 5, by releasing its securing means at 55, hence the airplane has dual or even multiple cargo capabilities, and by installation of seats or the like can carry personnel.

I claim as my invention:

1. A cargo airplane comprising a rounded fuselage incorporating a main cargo compartment terminating aft in an open end, a tail section separate from the fuselage but in flight constituting a rearward continuation of and closing the open rear end of the fuselage, hinge means disposed with its axis above the open rear end of the fuselage and substantially transversely horizontally and tangent to the round of the fuselage, interconnecting the tail section and the fuselage for upward swinging of the former from its flight position into an upswung open position, clear of the open end of the fuselage, and return to flight position, means reacting between the fuselage and the tail section to effect such movements, movable control surfaces mounted upon said tail section, control cables extending uninterruptedly from the fuselage along a line which extends past and is offset from said hinge means to the control surfaces on the tail section, in all positions of said tail section, means to maintain said cables tensioned in all positions of the tail section, and locking means interengageable between the tail section and the fuselage to retain the former in flight position, and for transmission of stresses between the two.

2. A cargo airplane comprising a fuselage incorporating a main cargo compartment terminating aft in an open end, a tail section separate from the fuselage but in flight constituting a rearward continuation of and closing the rear end of the fuselage, transverse hinge means disposed with its axis above the rear end of the fuselage and interconnecting the tail section and the fuselage for upward swinging of the former from its flight position into an upswung open position, clear of the open end of the fuselage, and return to flight position, means reacting between the fuselage and the tail section to effect such movements, movable control surfaces mounted upon said tail section, control cables extending uninterruptedly from the fuselage past said hinge means, in all positions of said tail section, guide means for said cables located within the upper part of the fuselage, close to but noncoincident with the hinge axis, further guide means therefor located on the lower part of the tail section, sheave means guiding said cables intermediate said two guide means, and located in the tail section, means for shifting said sheave means transversely of the tail section in accordance with the swung position of the latter to maintain the cables tensioned approximately evenly, and locking means interengageable between the tail section and the fuselage to retain the former in flight position, and for transmission of stresses between the two.

3. A cargo airplane as in claim 2, wherein said means to shift the sheave means includes a cam slot extending generally up and down on the tail section and guiding said sheave means for movement, and means coordinated with the tail section swinging means to shift said sheave means in the cam slot, said cam slot being formed and arranged to maintain the cables taut in all swung positions of the tail section.

4. A cargo airplane as in claim 3, wherein the means to swing the tail section includes a lead screw and nut reacting between the tail section and the fuselage, and motor means to actuate the same, and the means to shift the sheave means also includes a lead screw and nut reacting between the sheave means and the tail section, said last-mentioned lead screw and nut being connected for operation by said motor means and thereby being coordinated with the tail section swinging means.

5. A cargo airplane comprising a fuselage incorporating a main cargo compartment, a fuel tank therein, said fuselage terminating at its aft end at a transverse plane affording access to the rear end of the fuel tank, a tail section meeting said fuselage at such transverse plane and in flight constituting a rearward terminus of the fuselage, hinge means interconnecting the tail section and the fuselage for relative swinging while ground-borne, locking means for securing the tail section in its flight position, a fuel delivering boom carried by the tail section, and complemental male and female connectors mounted adjacent such transverse plane and carried one by the tank and the other by the tail section and leading to the boom, in position for interengagement by movement of the tail section into its flight position and locking there, and for disengagement by swinging of the tail section relative to the fuselage.

6. A cargo airplane as in claim 5, wherein the fuel tank is removably carried within the cargo compartment.

References Cited in the file of this patent

UNITED STATES PATENTS

| | | |
|---|---|---|
| 1,166,061 | Lehberger | Dec. 28, 1915 |
| 1,720,421 | Loudy | July 9, 1929 |
| 1,859,306 | Loening | May 24, 1932 |
| 2,095,440 | Hojnowski | Oct. 12, 1937 |
| 2,388,380 | Bathurst | Nov. 6, 1945 |
| 2,509,272 | Karnuth et al. | May 30, 1950 |
| 2,774,547 | Latimer-Needham et al. | Dec. 18, 1956 |

FOREIGN PATENTS

| | | |
|---|---|---|
| 679,057 | Great Britain | Sept. 10, 1952 |